No. 787,026. PATENTED APR. 11, 1905.
P. DIETZ.
SHEDDING MOTION FOR LOOMS.
APPLICATION FILED APR. 9, 1904.

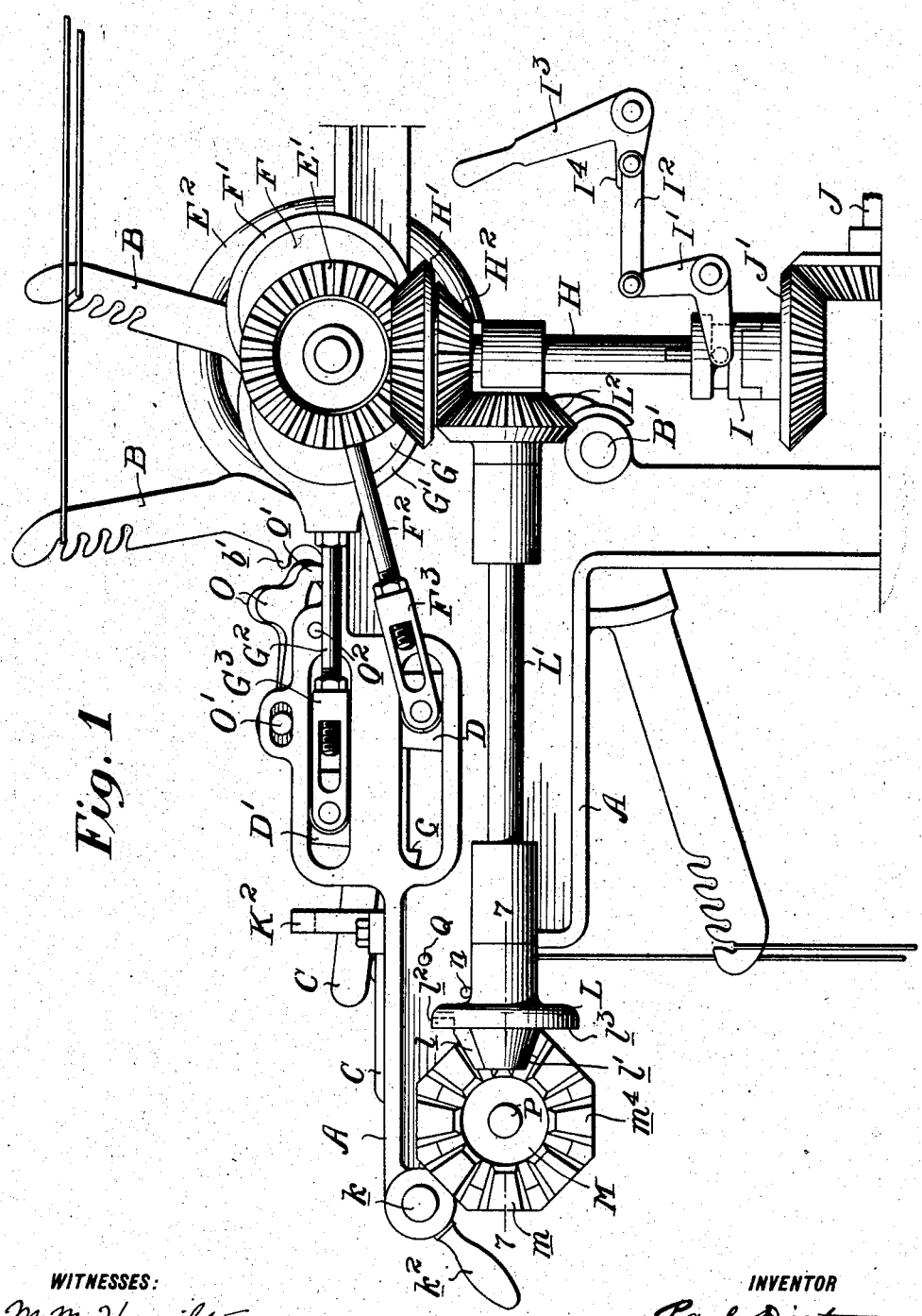

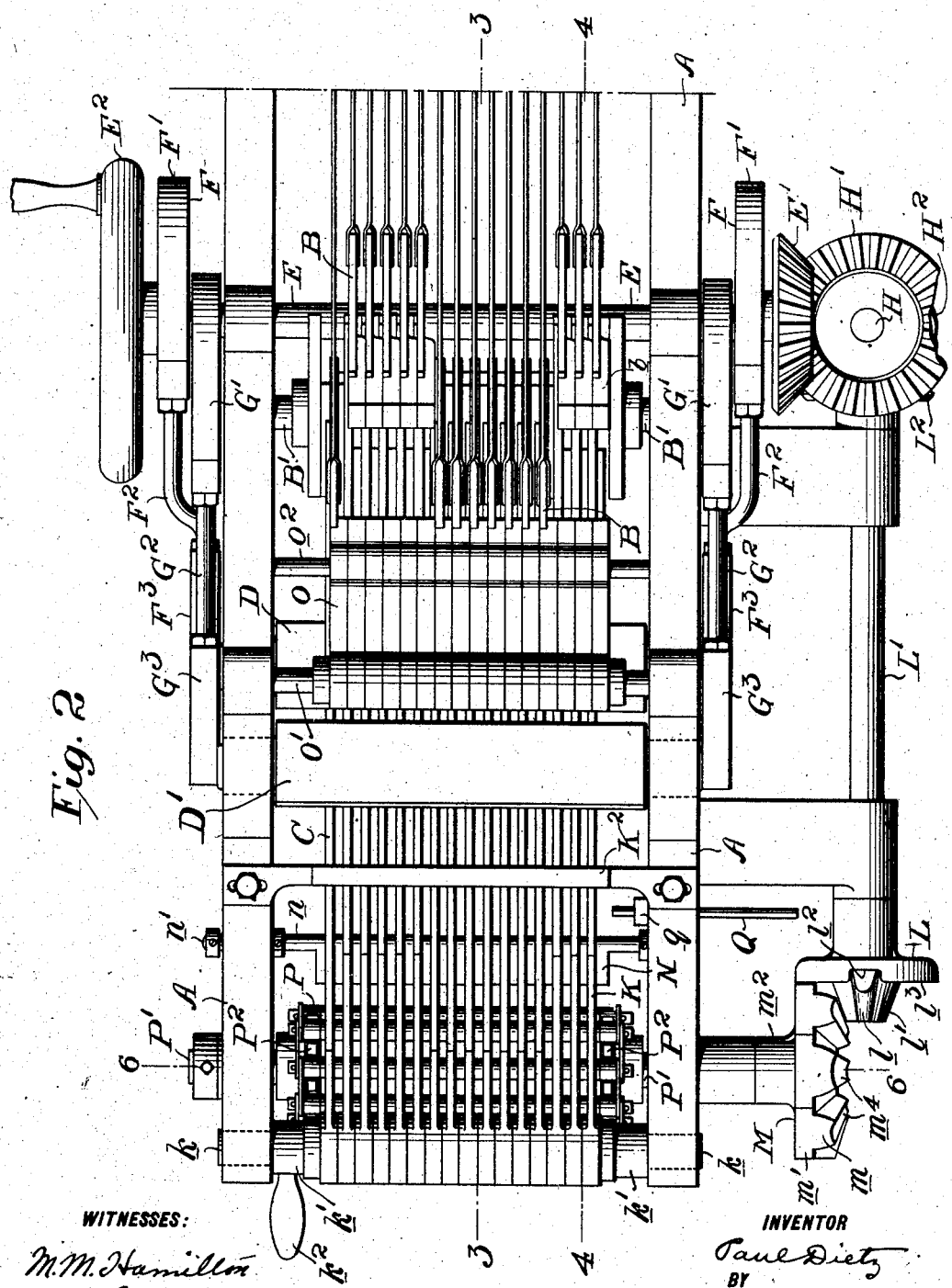

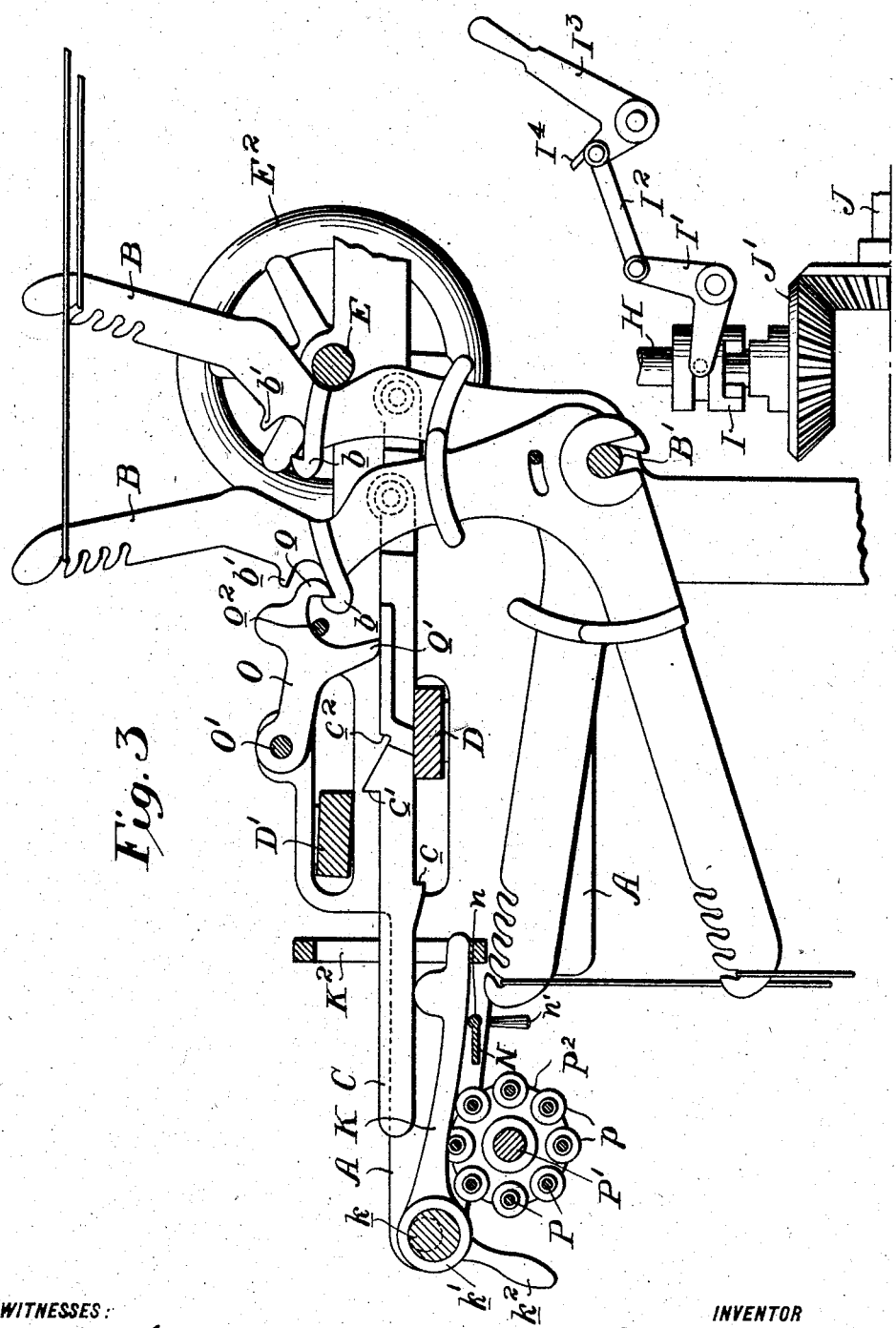

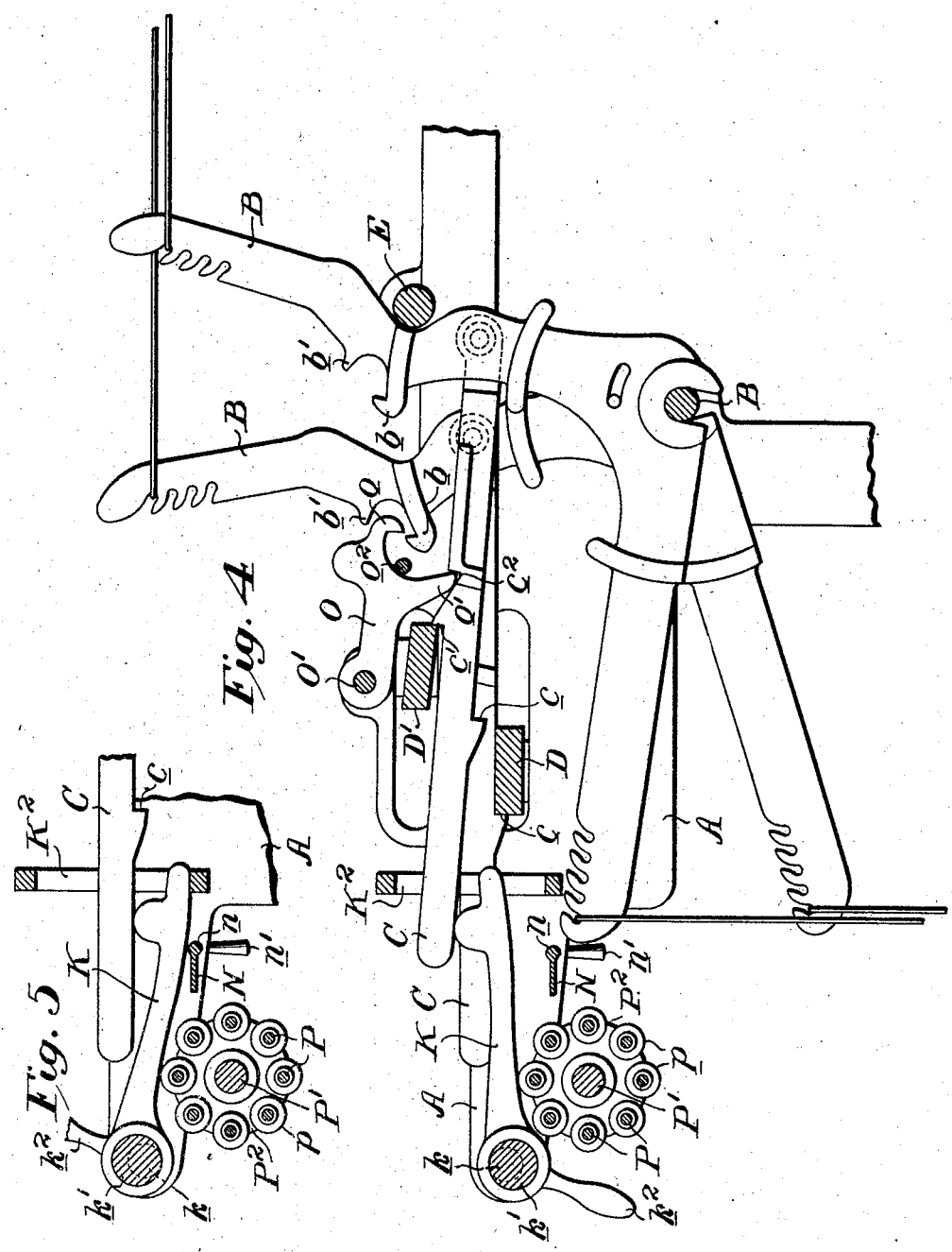

5 SHEETS—SHEET 5.

WITNESSES:
M. M. Hamilton
M. J. Ellis

INVENTOR
Paul Dietz
BY
Harding & Harding
ATTORNEYS.

No. 787,026. Patented April 11, 1905.

UNITED STATES PATENT OFFICE.

PAUL DIETZ, OF PHILADELPHIA, PENNSYLVANIA.

SHEDDING-MOTION FOR LOOMS.

SPECIFICATION forming part of Letters Patent No. 787,026, dated April 11, 1905.

Application filed April 9, 1904. Serial No. 202,307.

*To all whom it may concern:*

Be it known that I, PAUL DIETZ, a subject of the Emperor of Germany, residing at Philadelphia, county of Philadelphia, and State of Pennsylvania, have invented a new and useful Improvement in Shedding-Motions for Looms, of which the following is a full, clear, and exact description, reference being had to the accompanying drawings, which form a part of this specification.

My invention relates to shedding-motion for looms.

The objects of my invention are to automatically lock each harness-lever in each of its extreme positions as soon as it is moved thereto, to maintain it locked until it is desired to move it to the opposite direction, and to automatically unlock it preparatory to its movement to the opposite position, and to improve the mechanical construction of the actuating mechanism of the harness-levers.

Figure 6:
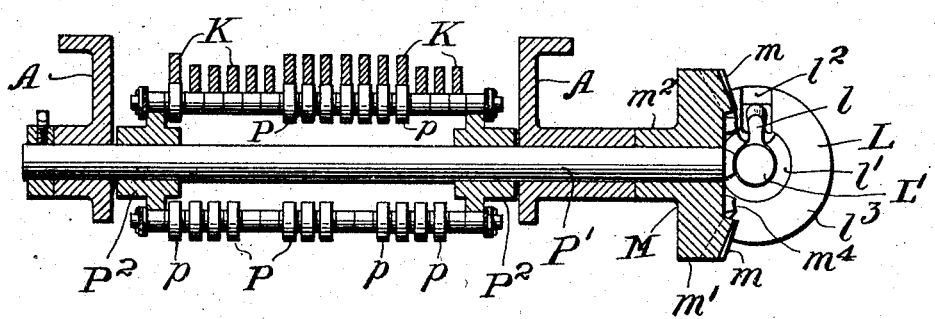
Figure 7:
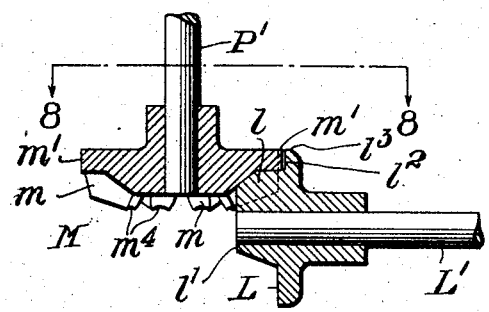
Figure 8:
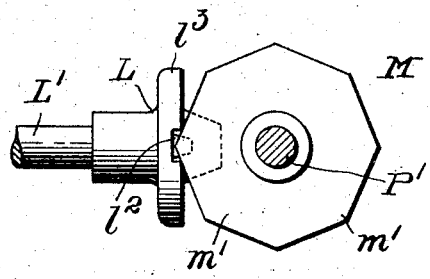

In the drawings, Figure 1 is a side elevation of the frame and the moving parts having different harness-levers and draw-bars in different opposite positions. Fig. 2 is a plan view of the same, showing the parts in the same position as Fig. 1. Fig. 3 is a vertical section on the line 3 3 of Fig. 2, the clutch mechanism, however, being shown in side elevation; Fig. 4, a vertical section on the line 4 4 of Fig. 2. Fig. 5 is a detail view of the finger-depressing means, showing the pivoted ends of the fingers raised to render them inoperative. Fig. 6 is a section on the line 6 6 of Fig. 2. Fig. 7 is a section on the line 7 7 of Fig. 1 with gears in a different position, and Fig. 8 is a section on the line 8 8 of Fig. 7.

A designates the frame of the shedding-machine.

B designates the harness levers or jacks pivoted on the shaft B'. These harness-levers are connected in the usual way, respectively, with the several heddle-frames and the notched draw-bars C. Each draw-bar C has a notch c on its lower side and opening toward the jack and which is adapted when the draw-bar is dropped to be engaged by the knife D to move the draw-bar and its attached jack to the left and lift the corresponding heddle-frame. Each draw-bar C has also a notch c' on its upper side and opening away from the jack and which is adapted when the draw-bar is raised to be engaged by the knife D' to move the draw-bar and its attached jack to the right to lower the corresponding heddle-frame. The object of this arrangement is as follows: Heretofore it has been customary to have the notches formed in the reverse way and to arrange them so that the upper knife will operate the raised draw-bars to the left to lift the corresponding heddle-frames and so that the lower knife will operate the lowered draw-bars to the right to lower the corresponding heddle-frames. It is also customary to operate the draw-bars by means of pivoted fingers K, operating in guides $K^2$ and raised by means of rollers $p$ on the pattern-chain P. By the old arrangement it is necessary that the rollers $p$ shall lift the fingers and draw-bars whenever it is desired to bring or hold the corresponding harness-levers in position to raise the corresponding heddle-frames. Now as the heddle-frames are normally raised it is necessary to hold the fingers normally raised, and therefore it is necessary to have a large number of rollers in the pattern-chain. This necessitates a very heavy chain, which is objectionable. With my arrangement the fingers K are lowered whenever it is desired to bring or hold the corresponding harness-levers in position to raise the corresponding heddle-frames. This enables me to dispense with many of the rollers and get along with a much lighter chain than heretofore.

The knives D and D' are actuated to reciprocate in opposite directions by the following means: E is a shaft adapted to be continuously rotated in one direction. F is an eccentric secured to shaft E near one end thereof. F' is a strap embracing the eccentric and having secured thereto the screw-threaded rod $F^2$, engaging the casting $F^3$. A corresponding eccentric, strap, screw-threaded rod, and casting are connected to the shaft at the other end thereof. The knife D is secured to and between the castings. G is an eccentric secured to shaft E adjacent to the eccentric F. G' is a strap embracing the eccentric and having secured thereto the screw-threaded rod $G^2$, engaging the casting $G^3$. A corresponding eccentric, strap, screw-threaded rod, and casting are connected to the other end of the shaft. The knife D' is secured to and between the last-named castings. The eccentrics F and G have their largest diameters on opposite sides of the shaft, so that when one knife is moving in one direction the other knife is moving in the opposite direction.

The shaft E is driven by the following means: E' is a bevel-gear on one end of the shaft. H' is a bevel-gear engaging therewith and on the upright driving-shaft H. I is a clutch splined to the shaft H. J' is a gear driven from the main driving-shaft J of the loom. The gear J is provided with clutch-teeth adapted to be engaged by the clutch I. When the clutch I is moved into engagement with the gear J, the latter drives the shaft H, which in turn drives the shaft E. When the clutch I is moved out of engagement with the driving-gear J', the shaft E may be turned by hand by means of the hand-wheel $E^2$ on the said shaft. In order to shift the clutch to lock it in engagement with the gear J', I have provided the following means: I' is a bell-crank lever pivoted to the machine-frame, one arm engaging a peripheral groove in the clutch, while the other arm is connected, by means of the link $I^2$, with the operating-lever $I^3$, pivoted on the machine-frame. $I^4$ is a lug on the operating-lever $I^3$. When the operating-lever is moved to shift the clutch, the lug $I^4$ engages the link $I^2$, and the pivot of the operating-lever and the two ends of the link are brought into alinement, thus bringing and holding the mechanism on a dead-center, which makes it impossible to unlock itself. When the operating-lever is turned in the opposite direction, the clutch is disengaged. (See Fig. 3.)

In order to lock the harness-levers in either extreme position and to unlock them preparatory to moving them into the opposite position, I have provided the following mechanism: On the upper face of each draw-bar is the notch $c^2$. Secured to each harness-lever is the hook $b$. Extending across the machine is the shaft O', on which are pivoted the locking devices O, one for each harness-lever. These locks have two arms, one arm, $o$, being hooked and adapted to be engaged by the hook $b$ when the harness-lever is pulled to the left, thus locking the latter in that position. When the draw-bar is raised to permit it to be engaged by the upper knife to move it and the harness-lever to the right, the draw-bar engages the other arm, $o'$, of the lock, and thus disengages the arm $o$ from hook $b$. When the harness-lever is moved to the right, the arm $o'$ drops into the notch $c^2$, thus preventing the return of the harness-lever until the draw-bar is dropped preparatory to again moving the harness-lever to the left. The rod $o^2$, extending across the machine, limits the downward movement of the locking device. The lug $b'$ engages the curved hooked end of the arm $o$ as the harness-lever moves to the left and depresses said arm, thus insuring its engagement with the hook $b$.

In order to permit the pattern device to be turned in either direction, I have provided the following mechanism: On the driving-shaft H is a bevel-gear $H^2$. This bevel-gear may be formed, as shown, integral with the gear H'. $L^2$ is a bevel-gear engaging gear $H^2$. The bevel-gear $L^2$ is on one end of the shaft L', which extends along the machine and terminates adjacent to the pattern-shaft P'. L is a bevel-gear sleeved on this end of the shaft L'. The gear L is constructed in the following manner: One end thereof has a conical annular projection $l'$ embracing the shaft projecting beyond the end of the shoulder $l^3$. Projecting radially from said projection is a tooth $l$. $l^2$ is a radial inset in one end of said sleeve, into which said tooth extends. M is a bevel-gear on the pattern-shaft P'. The gear consists of the sleeve $m^2$, the polygonal disk $m'$, and the teeth $m$ on the outer side and adjacent to the periphery of the disk. The teeth correspond in number to the flattened peripheral sections of the polygonal disk and are located, respectively, centrally thereof, and their peripheries are flattened, so as to be flush, respectively, therewith. The space between the teeth is opposite the angles formed at the junction of the flat peripheral sections. The outer side of each tooth has a concavity $m^4$. The tooth $l$ of the gear L is adapted to engage any of the teeth $m$ of gear M. The pattern-shaft P' carries the sprocket-wheels $P^2$ and $P^2$, which drive the sprocket-chain P, before mentioned.

The normal operation of the mechanism just described is as follows: When the clutch I is moved into engagement with the gear J', thus rotating the shafts H and E and reciprocating the knives D and D', as before described, the gear $H^2$, meshing with the gear $L^2$, rotates the shaft L' and the gear L. At each rotation of the gear L the tooth $l$ engages one of the teeth $m$ and turns the gear M a fraction of a revolution corresponding to the number of teeth $m$. This turns the pattern-shaft P'. When the gears L and M are in engagement, as just described, the tooth $l$ extends between two adjacent teeth $m$ $m$ of the gear M, and the angular edge formed at the junction of the two flat peripheral sections of disk $m'$, corresponding to said tooth $m'$ $m'$, projects into the inset $l^2$. (See Fig. 8.) When the tooth $l$ passes out of engagement with gear M, the gears are in the position shown in Figs. 1, 2, and 6, in which one of the flat sections of the periphery of disk $m'$ is opposite the flat surface of the shoulder $l^3$, thus preventing the gear M from turning a distance of more than one tooth and holding said gear stationary until the gear L has made a complete revolution. The concave surface $l^4$ of the tooth $l$, corresponding to said flat section, alines with the conical surface of the projection $l'$, permitting the latter to turn without being obstructed by said tooth. On the next revolution of the gear L it again engages the gear M and again turns it the distance of one tooth. When the clutch I is moved out of engagement with the gear J, the shaft E may be turned by hand in the opposite direction, thus reversing the direction of shafts H and L'. This rotates gear L in the opposite direction to that hereinbefore described, causing a step-by-step movement to be imparted to gear M and pattern-shaft P' in a direction opposite to that hereinbefore described.

I have provided the following means for simultaneously lifting all the fingers out of the line of travel of the pattern-chain in case it is desired to simultaneously raise all the heddle-frames. The fingers K are pivoted on the eccentric $k'$ on the shaft $k$. Secured to the eccentric is the operating lever or handle $k^2$, whose normal position is that shown in Figs. 3 and 4. When the operating-lever is thrown upwardly, as in Fig. 5, the pivoted ends of the fingers K will be raised and the opposite ends of these fingers that are in a raised position will drop and rest upon the bottom cross-piece of the guide $K^2$, thus causing all of the draw-bars that are raised by said fingers to also drop. Now when the shaft E is turned the lower knife will move all the draw-bars and jacks to the left, raising all the heddle-frames. It will be understood that in this position of the fingers they are entirely out of the line of travel of the pattern-chain.

To simultaneously lift all the draw-bars in case it is desired to simultaneously lower all the heddle-frames, I have provided a shaft $n$, extending between the side pieces of the frame A, one end of the shaft extending through the frame and having a lever or handle $n'$. On the shaft $n$ is a blade or shifter N, which when the shaft $n$ is turned engages all of the fingers K that are lowered and lifts them and the draw-bars controlled thereby. Now when the shaft E is turned the upper knife will move all such draw-bars and their corresponding jacks to the right, thus lowering all the heddle-frames.

To hold out of action any desired number of jack-levers during the operation of the loom, I first raise all the fingers by means of the blade N, thus bringing all the draw-bars onto a common upper level. Then I insert the retaining device or bar Q through an orifice in the frame and bracket $q$, extending it a distance sufficient to rest under the fingers corresponding to the jacks which it is desired to hold out of operation. The fingers thus operated will not be operated by the pattern-chain, and after the corresponding draw-bars are once shifted to the right they will be held there and maintained out of action during the entire operation of the loom.

It has been found essential to a complete disclosure of the invention hereinafter claimed to describe the specific means whereby the pattern-chain is intermittently moved in either direction and whereby the knives may be operated in substantially the same manner in whichever direction the driving-shaft is revolved, while causing a proper step-by-step movement to be imparted to the pattern-chain forwardly or backwardly, dependent upon the direction of rotation of the driving-shaft. This mechanism, however, is not specifically claimed herein, but will form the subject of a divisional application to be hereafter filed. It has also been deemed necessary to refer to the clutch for connecting and disconnecting the immediate driving-shaft for the shedding-motion with the main loom-shaft, so that the shedding-motion may be operated from the main loom-shaft or by hand, as desired. It has also been considered necessary to describe the specific form of actuating means for the clutch whereby the clutch may lock the immediate driving-shaft for the shedding motion in driving engagement with the main loom-shaft. This also is not specifically claimed herein, but will form the subject-matter of a second divisional application to be hereafter filed.

Having now fully described my invention, what I claim, and desire to protect by Letters Patent, is—

1. In a shedding-motion for looms, the combination with the harness-levers and mechanism for operating the same, of an independent locking device for each harness-lever adapted to lock said harness-lever when it is moved to either extreme position.

2. In a shedding-motion for looms, the combination, with the harness-levers, the draw-bars connected therewith and the knives for actuating the draw-bars, of a separate locking device for each harness-lever adapted to lock said harness-lever when it is moved to either extreme position and to release said harness-lever when its corresponding draw-bar is operated to dictate the return of said harness-lever to the opposite position.

3. In a shedding-motion for looms, the combination, with the harness-levers, the draw-bars connected therewith and the knives for actuating the draw-bars, each of said draw-bars having a notch, of a hook connected to each harness-lever, and a two-armed lock for each harness-lever, one arm being adapted to be engaged by said hook when said harness-lever is moved to one extreme position, and the other arm being adapted to engage the notch in said draw-bar when the harness-lever is moved to the other extreme position.

4. In a shedding-motion for looms, the combination, with the harness-levers, the draw-bars connected therewith and the knives for actuating the draw-bars, of a hook connected to each harness-lever, and an independent lock for each harness-lever, said lock being adapted to be engaged by said hook when said harness-lever is moved to one extreme position and being adapted to be engaged by the corresponding draw-bar to release said hook when said draw-bar is operated to dictate the return of said harness-lever to the opposite position.

5. In a shedding-motion for looms, the combination, with the harness-levers, the draw-bars connected therewith and the knives for actuating the draw-bars, each of said draw-bars having a notch, and an independent lock for each draw-bar, said lock being adapted to engage said notch when said draw-bar is raised and moved to one extreme position, and to be released from said notch when said draw-bar is lowered.

6. In a shedding-motion for looms, the combination, with the harness-levers, the draw-bars connected therewith and the knives for actuating the draw-bars, of a separate two-armed locking device for each harness-lever and draw-bar, one arm being adapted to engage and lock said harness-lever when it and its corresponding draw-bar is moved to one extreme position and the other arm being adapted to engage and lock said draw-bar when it is moved to the other extreme position.

7. In a shedding-motion for looms, the combination, with the harness-levers, the draw-bars connected therewith and the knives for actuating the draw-bars, of a separate two-armed locking device for each harness-lever and draw-bar, one arm being adapted to engage and lock said harness-lever when it and its corresponding draw-bar is moved to one extreme position and the other arm being adapted to engage and lock said draw-bar when it is moved to the other extreme position, the last-named arm being also adapted to be engaged by said draw-bar to disengage the first-named arm from said harness-lever.

8. In a shedding-motion for looms, the combination, with the harness-levers, the draw-bars connected therewith and the knives for operating the draw-bars, of the fingers for raising the draw-bars, and the pattern-chain for operating the fingers, the fingers being pivoted at one end and adapted to engage the draw-bars at the other end and being engaged between their ends by the pattern-chains, and means to move the pivoted ends of the fingers upwardly and to limit the downward movement of the opposite ends, whereby said fingers will be moved out of engagement with the pattern-chain.

9. In a shedding-motion for looms, the combination, with the harness-levers, the draw-bars connected therewith, and the knives for actuating the draw-bars, the fingers for raising the draw-bars, the pattern-chain for operating the fingers, and means for withdrawing all the fingers out of engagement with the pattern-chain without lifting the draw-bars.

10. In a shedding-motion for looms, the combination, with the harness-levers, the draw-bars connected therewith and the knives for operating the draw-bars of the fingers for raising the draw-bars, and the pattern-chain for operating the fingers, an eccentric upon which one end of the fingers are pivoted, means for limiting the downward movement of the draw-bar-engaging ends of the fingers, the fingers being engaged between their ends by the pattern-chains, and means for turning the eccentric to lift the pivoted ends of the fingers, whereby they are all moved out of engagement with the pattern-chain.

11. In a shedding-motion for looms, the combination, with the harness-levers, the draw-bars connected therewith, and the knives for actuating the draw-bars, the fingers for raising the draw-bars, the pattern-chain for operating the fingers, means for withdrawing all the fingers out of engagement with the pattern-chain and into position to permit all the draw-bars to drop, and a shifter for lifting all the draw-bars, whereby all the heddle-frames may be either simultaneously raised or lowered.

12. In a shedding-motion for looms, the combination, with the harness-levers, the draw-bars connected therewith, and the knives for actuating the draw-bars, the fingers for raising the draw-bars, the pattern-chain for operating the fingers, means for withdrawing all the fingers out of engagement with the pattern-chain without lifting the draw-bars, and a shifter for raising all the fingers and thereby lifting all the draw-bars.

13. In a shedding-motion for looms, the combination, with the harness-levers, the draw-bars connected therewith and the knives for operating the draw-bars, of the fingers for raising the draw-bars, and the pattern-chain for operating the fingers, the fingers being pivoted at one end and adapted to engage the draw-bars at the other end and being engaged between their ends by the pattern-chains, means to move the pivoted ends of the fingers upwardly thereby permitting their free ends to drop, thereby permitting the draw-bars to drop, and means to move the free ends of the fingers upwardly, thereby lifting the draw-bars.

In testimony of which invention I have hereunto set my hand, at Philadelphia, on this 4th day of April, 1904.

PAUL DIETZ.

Witnesses:
M. M. HAMILTON,
WILLIAM B. MARKS.